(12) United States Patent
Farrington

(10) Patent No.: US 6,169,683 B1
(45) Date of Patent: Jan. 2, 2001

(54) RESONANT GATE DRIVE FOR SYNCHRONOUS RECTIFIERS

(75) Inventor: Richard Farrington, Heath, TX (US)

(73) Assignee: Ericsson Inc., Richardson, TX (US)

(*) Notice: Under 35 U.S.C. 154(b), the term of this patent shall be extended for 0 days.

(21) Appl. No.: 09/414,247

(22) Filed: Oct. 7, 1999

(51) Int. Cl.$^7$ .......................... H02M 7/217; H02M 7/68; H02H 7/125
(52) U.S. Cl. ................ 363/127; 363/53; 363/89
(58) Field of Search .................. 363/50, 53, 89, 363/127, 125, 81

(56) References Cited

U.S. PATENT DOCUMENTS

| | | | |
|---|---|---|---|
| 4,857,822 * | 8/1989 | Tabisz et al. | 323/282 |
| 5,179,512 * | 1/1993 | Fischer et al. | 363/127 |
| 5,237,606 * | 8/1993 | Ziermann | 363/21 |
| 5,708,571 * | 1/1998 | Shinada | 363/16 |
| 5,734,563 * | 3/1998 | Shinada | 363/127 |
| 5,805,432 * | 9/1998 | Zaitsu et al. | 363/16 |
| 5,870,299 * | 2/1999 | Rozman | 363/127 |
| 5,991,167 * | 11/1999 | Van Lerberghe | 363/16 |
| 5,991,171 * | 11/1999 | Cheng | 363/21 |
| 5,999,417 * | 12/1999 | Schecht | 363/131 |

* cited by examiner

*Primary Examiner*—Peter S. Wong
*Assistant Examiner*—Bao Q. Vu
(74) *Attorney, Agent, or Firm*—Arthur I. Navarro

(57) ABSTRACT

An externally-driven synchronous rectifier circuit (18) comprises first and second synchronous rectifiers (SQ1, SQ2), and first and second synchronous rectifier recovery switches (SQ3, SQ5), and a pair of resonant inductors (LR1, LR2). The resonant inductors (LR1, LR2) store the energy normally loss during charging and discharging the input capacitance of the first and second synchronous rectifiers (SQ1, SQ2). The recovery switches (SQ3, SQ5) transfer the stored energy from the at least one inductor ($L_R$) to the output terminal (Vout) creating a more energy efficient circuit (18).

19 Claims, 7 Drawing Sheets

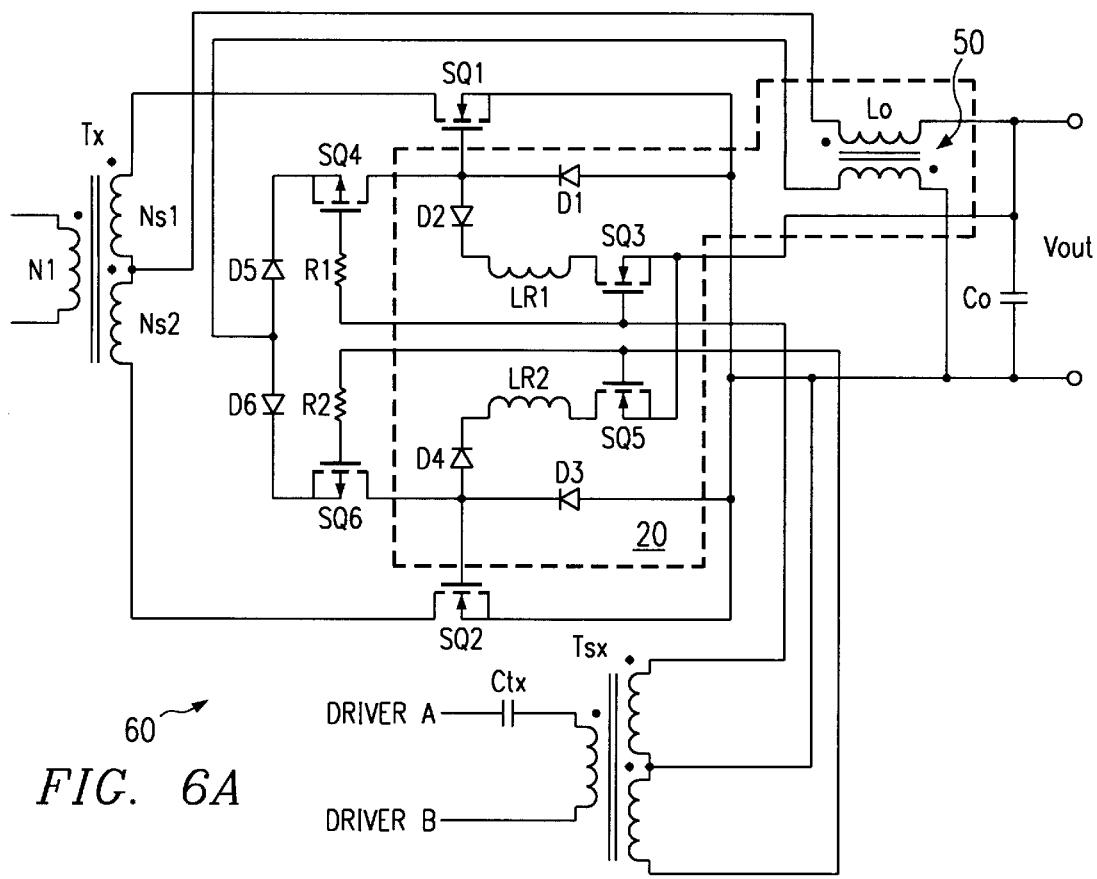
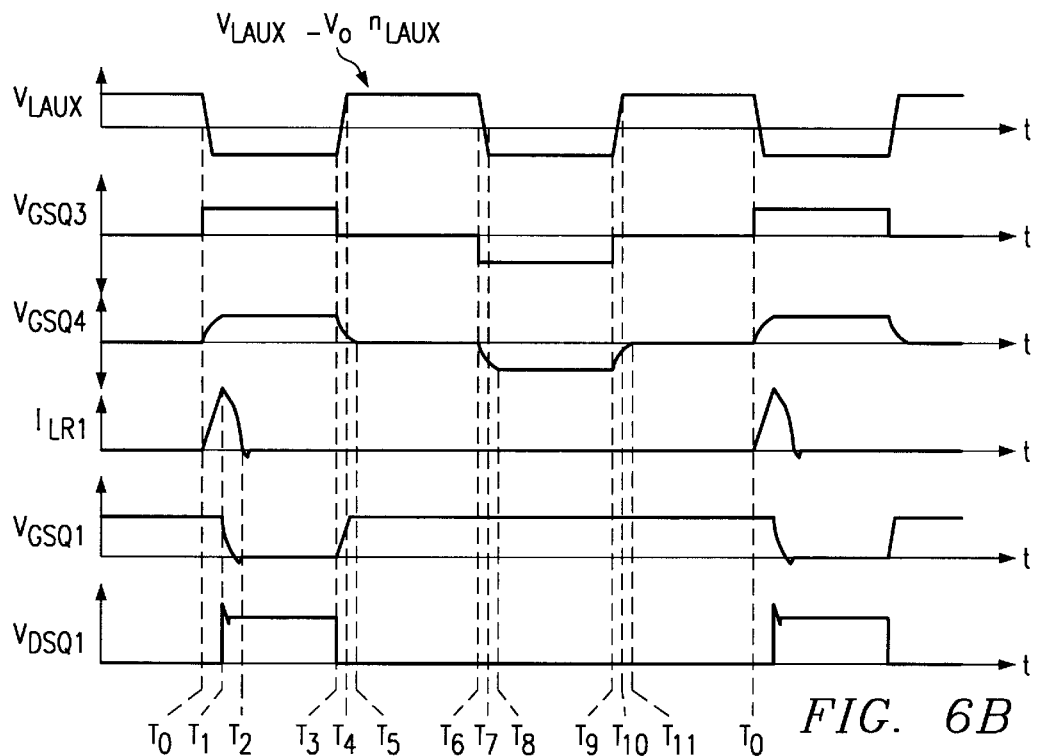
FIG. 6A
FIG. 6B

RESONANT GATE DRIVE FOR SYNCHRONOUS RECTIFIERS

TECHNICAL FIELD

This invention relates generally to DC-to-DC converters, and to a resonant gate drive for synchronous rectifiers using an external driving circuit. More particularly, the invention relates to an externally driven synchronous rectifier circuit for a DC-to-DC power converter having an energy recovery circuit configured for storing energy associated with charging and discharging the input capacitance of MOSFET type synchronous rectifier devices.

BACKGROUND OF THE INVENTION

As logic integrated circuits (ICs) have migrated to lower working voltages in search for higher operating frequencies, and as overall system sizes have continued to decrease, power supply designs with smaller and higher efficiency power modules are in demand. In an effort to improve efficiencies and increase power densities, synchronous rectification has become necessary for these type of applications. Synchronous rectification has gained great popularity in the last ten years as low voltage semiconductor devices have advanced to make this a viable technology. However, as the frequency of operation increases, switching losses become important.

For applications with synchronous rectification, the energy dissipated by charging and discharging the input capacitance of the rectifiers can be significant. In order to obtain the full benefit from synchronous rectification, components with low drain to source resistance have to be selected. However, low drain to source resistance usually results in devices with a relatively large die and a large input capacitance. Furthermore, the input capacitance needs to be charged and discharged in nano-seconds. This means that as the frequency of operation increases the losses associated with the gate-drive circuitry become significant.

Topologies have been suggested to minimize switching losses due to current and voltage overlap and to minimize switching losses due to the output capacitance of typical semiconductor devices. In "A MOS gate drive with resonant transitions", IEEE PESC 91 Conference Proceedings, PP. 527–532, D. Maksimovic presented a resonant gate drive based on the quasi-square-wave power conversion. This solution provides a means for charging and discharging the input capacitance of a MOS type device in a loss-less fashion but at the expense of large amounts of circulating energy. A similar idea based on the zero-voltage-switched (ZVS) quasi-resonant converter (QRC) was proposed in "Novel High Efficiency Base Drive Using Zero Voltage Switching Converter", IEEE PESC 91 Conference Proceedins, pp. 545–550 by H. S. Kim et al. and B. S. Jacobson, in "High Frequency Resonant Gate Driver With Partial Energy Recovery", High Frequency Power Conversion Conference Proceedings 1993, pp. 133–141, proposed a third solution where a fraction of the charging and discharging energy is recovered.

The first two (2) prior art solutions do not embrace a level of efficiency where most of the charging and discharging energy is recovered. The third solution is better suited for switching frequencies in the megahertz range because of its basic operation thus limiting its use in synchronous rectifier circuits. What is needed is a resonant gate drive for an externally-driven synchronous rectification circuit which does not lose large amounts of circulating energy and which can be efficiently used with switching frequencies outside the megahertz range.

SUMMARY OF THE INVENTION

This present invention is a new gate drive configuration that can be used in applications where an external driving circuit is needed to drive the synchronous rectifiers in non self-driven applications.

In one embodiment, disclosed is an energy recovery mechanism for an externally driven synchronous rectifier circuit having a primary transformer, first and second synchronous rectifiers, an output terminal, and an external driving circuit configured to provide the timing signals for driving said first and second synchronous rectifiers. The energy recovery mechanism comprises first and second resonant inductors each having first and second terminals. Corresponding first and second recovery switches are coupled to the first terminals of the first and second resonant inductors. A first set of diodes is arranged to direct current into the second terminal of the first resonant inductor and a second set of diodes arranged to direct current into the second terminal of the second resonant inductor. The first and second recovery switches are further coupled to the external driving circuit for causing current to enter the first and second resonant inductors for recovering energy used in charging and discharging the input capacitance associated with the first and second synchronous rectifiers.

Also disclosed is a resonant gate drive for an externally-driven synchronous rectifier suitable for use in a DC-to-DC power converter. The synchronous rectifier circuit comprises a primary transformer having a primary and secondary winding with the secondary winding having a first terminal and a second terminal. A first synchronous rectifier is operably coupled to the first terminal of the secondary winding and a second synchronous rectifier is operably coupled to the second terminal of the secondary winding. An external drive circuit is used and operably coupled to the first and second synchronous rectifiers to provide the drive timing for the first and second synchronous rectifiers. An energy recovery circuit is coupled to the first and second synchronous rectifiers and configured for storing energy associated with charging and discharging their input capacitance. An output voltage terminal is coupled to said energy recovery circuit for receiving rectified voltage waveforms.

In another embodiment, the energy recovery circuit for each rectifier includes an additional resistor coupled to the first synchronous rectifier diode of the recovery circuit. The resistor ensures that the energy recovery circuit will operate correctly in situations where current flows back through the first synchronous diode thus re-charging the input capacitance of the synchronous rectifiers which will turn back on at an incorrect time. By adding the resistor, the voltage across the gate of the synchronous rectifiers is allowed to swing below zero to account for the back current.

In yet another embodiment, the circuit for energy recovery will utilize N-type MOSFETS to limit the voltage across the synchronous rectifiers to a different value than that of the input voltage of the synchronous rectifiers.

In another embodiment, the circuit for energy recovery will utilize an auxiliary winding to charge the gate capacitance of the synchronous rectifiers in a manner where the energy to charge the gate capacitance is recovered. The auxiliary winding will facilitate the correct charging pulse for the synchronous rectifiers.

Further disclosed is a method of recovering energy of an externally-driven synchronous rectifier circuit. The method includes the steps of capturing energy from the input capacitance of the synchronous rectifiers in at least one inductor and transferring the energy from the storage inductors to the output when the recovery switches turn off. The method also includes the step of recovering the energy needed for charging and discharging the synchronous rectifiers.

A technical advantage of the invention is the use of a resonant gate drive utilizing an externally driven synchronous rectification scheme.

Still another advantage is the achievement of a loss-less drive that can be used with both full-wave and half-wave rectifier configurations.

BRIEF DESCRIPTION OF THE DRAWINGS

The above features of the present invention will be more clearly understood from consideration of the following descriptions in connection with accompanying drawings in which:

FIG. 6A is yet another embodiment of the present invention with an auxiliary output inductor winding;

FIG. 6B shows typical waveforms representing the operation of the resonant gate drive shown in FIG. 6A;

Corresponding numerals and symbols in the different figures refer to corresponding parts unless otherwise indicated.

DETAILED DESCRIPTION OF PREFERRED EMBODIMENTS

The following is a description of the structure and method of the present invention. A prior art circuit will be discussed first, followed by a description of several preferred embodiments and alternatives of the present invention, and a discussion of the advantages.

Figure 1:
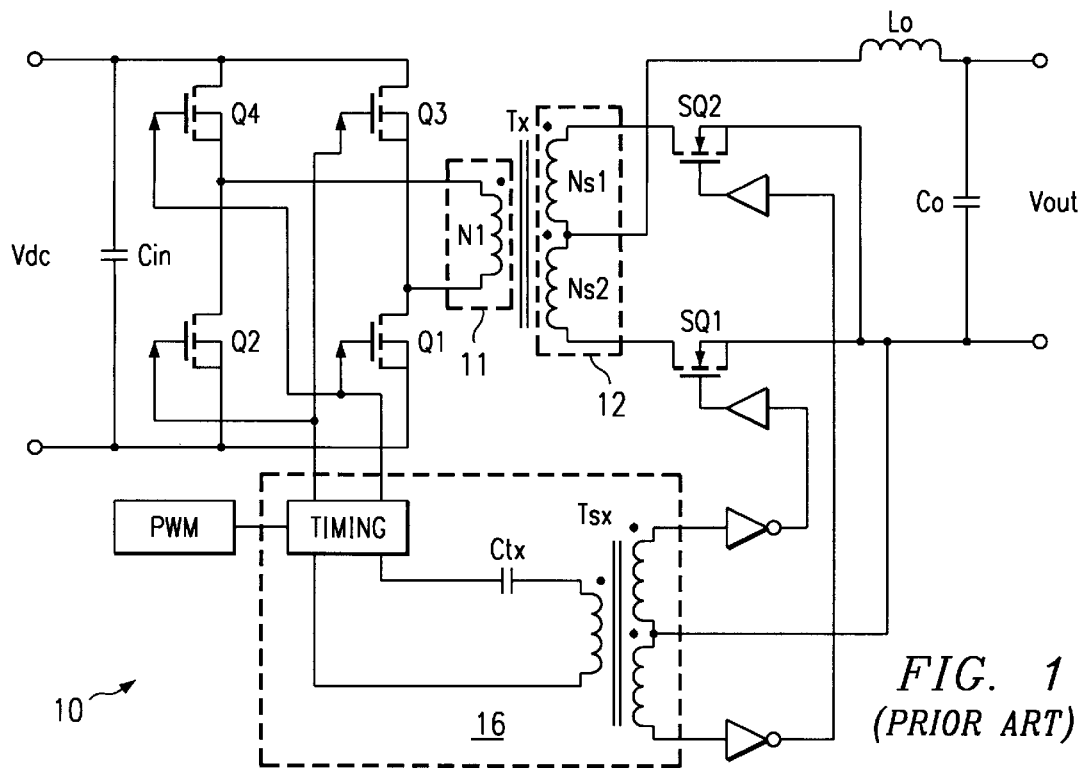
FIG. 1 illustrates a prior art hard-switched full-bridge converter with externally driven synchronous rectification.

FIG. 1 shows a prior art externally-driven synchronous rectifier circuit for a hard-switched full-bridge converter, generally labeled 10. In particular, the synchronous rectifier circuit 10 includes a set of synchronous rectifiers SQ1 and SQ2, primary transformer Tx having a primary winding 11 and secondary winding 12, respectively, output inductor Lo, and output capacitor Co, and an external drive circuit 16. SQ1 and SQ2 are coupled to the secondary winding 12 of the transformer Tx. Synchronous rectifiers SQ1 and SQ2 are also coupled to transformer Tsx of external drive circuit to derive the necessary timing signals that provide the turn-on and turn-off signals for the synchronous rectifiers SQ1 and SQ2.

In the prior art implementation shown in FIG. 1, the power loss associated with charging and discharging the input capacitance of each of the synchronous rectifiers SQ1 and SQ2 is greater than or equal to $fs \cdot C_{iss\_eq} \cdot Vgs^2$ where fs is the frequency of operation, $C_{iss\_eq}$ is the equivalent input capacitance of the synchronous rectifiers SQ1 and SQ2, and Vgs is the voltage to which the input capacitance is charged. The energy loss associated with the charging and discharging $C_{iss\_eq}$ is not recovered, meaning the rectification circuit 10, as a whole, is inefficient. Thus what is needed is a means for recovering the energy associated with charging and discharging the input capacitance $C_{iss\_eq}$ of the first and second synchronous rectifiers SQ1 and SQ2.

Figure 2A:
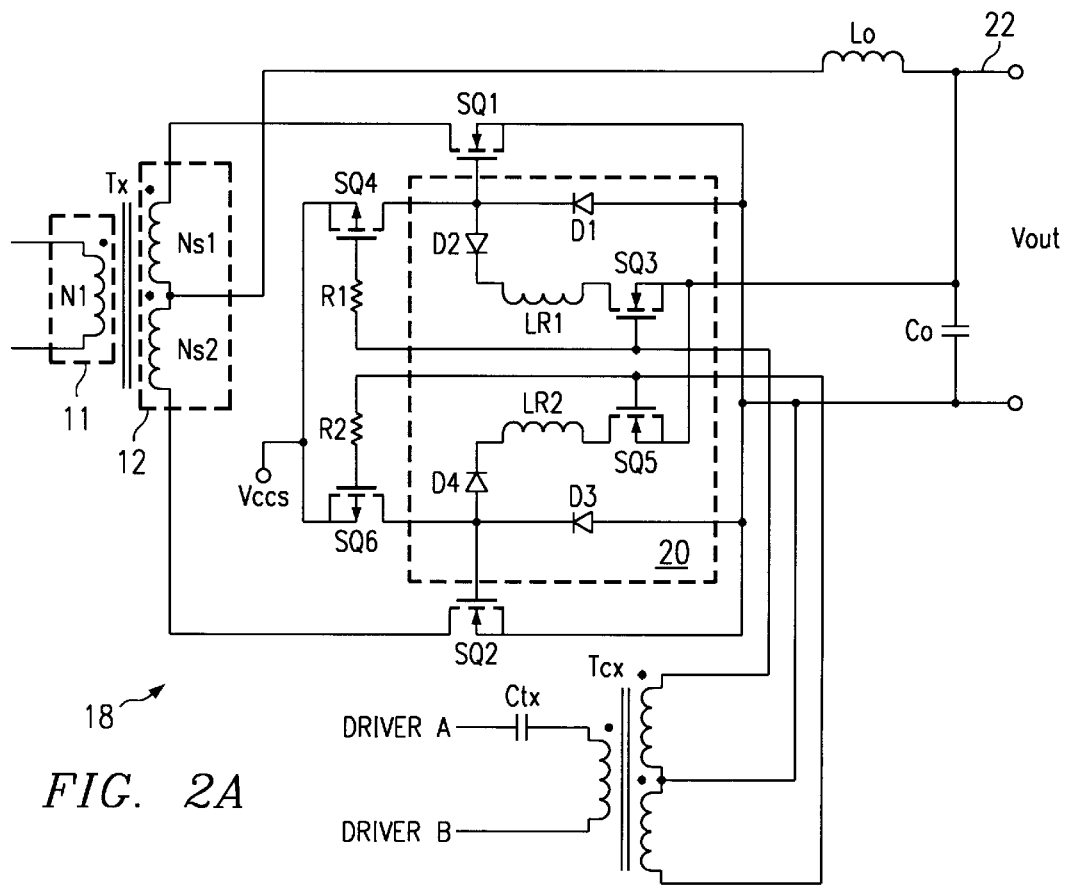
FIG. 2A illustrates a full wave rectifier with externally driven synchronous rectification utilizing an embodiment of the present invention.

FIG. 2A shows a synchronous rectifier circuit 18 with an energy recovery circuit 20, according to the present invention. In particular, the energy recovery circuit 20 can be used to recover the energy stored in the equivalent capacitance $C_{iss\_eq}$ of the synchronous rectifiers SQ1 and SQ2 upon discharging. As shown, the energy recovery circuit 20 comprises two resonant inductors LR1 and LR2 and four diodes D1, D2, D3, and D4. Resonant inductors LR1 and LR2 and diodes D1, D2, D3, and D4 are used to store the energy resulting from discharging the first and second synchronous rectifiers SQ1 and SQ2.

In order to transfer the energy from the resonant inductors LR1 and LR2 to the output terminal Vout, the resonant inductors LR1 ad LR2 are coupled to the recovery switches SQ3 and SQ5. The recovery switches SQ3 and SQ5 are, in turn, coupled to the output terminal Vout. Any drive cross conduction energy and all of the energy stored in the resonant inductors LR1 and LR2 are transferred to the recovery switches SQ3 and SQ4 and then to the output terminal Vout, thus providing a more energy efficient circuit 18. Thus, the energy required to charge the input capacitance $C_{iss\_eq}$ of the synchronous rectifiers SQ1 and SQ2 is recovered.

Figure 2B:
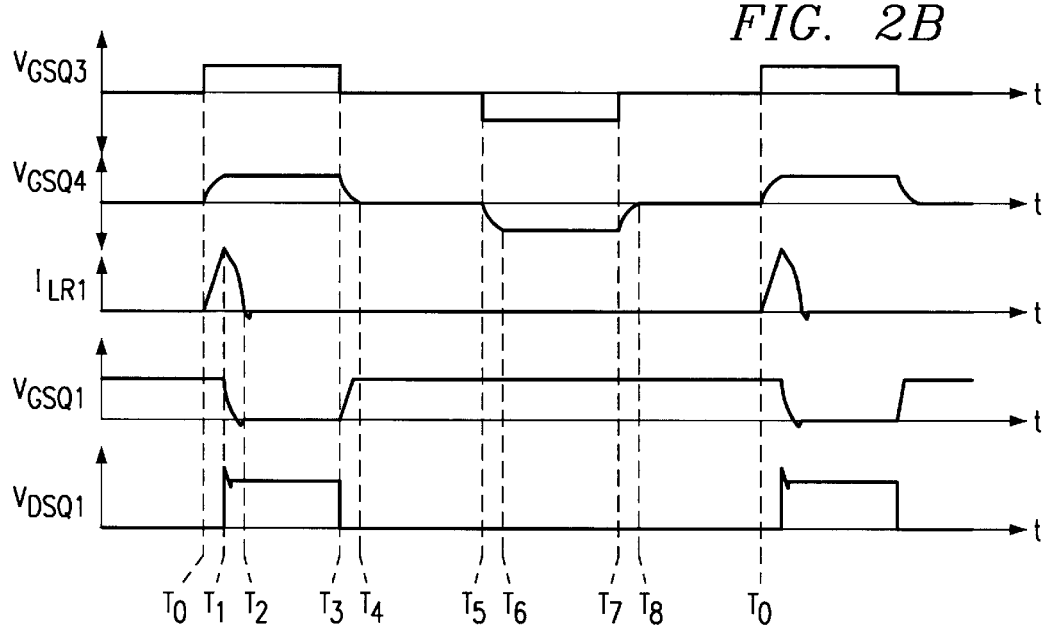
FIG. 2B shows voltage waveforms of the externally driven synchronous rectifier for a push-pull topology.

FIG. 2B shows the basic waveforms representing the operation of the synchronous rectifier circuit 18 for recovering the energy from discharging first synchronous rectifier SQ1. Before time T0, both synchronous rectifiers are on and the load current freewheels through the shorted secondary winding 12 and the synchronous rectifiers SQ1 and SQ2. At time T0, the signal coming from the primary winding 11 turns on recovery switch SQ3. Since switch SQ4 is still on, current builds through resonant inductor LR1.

At time T1, switch SQ4 turns off and the current through LR1 starts discharging the input capacitance of synchronous rectifier SQ1. During this stage, inductor LR1 discharges the input capacitance $C_{iss\_eq}$ of the synchronous rectifier SQ1 in a resonant manner. Switch SQ3 transfers this energy to the output terminal Vout. This resonance drives the voltage across the gate of first synchronous rectifier SQ1 below ground as the resonant inductor LR1 resets. Diode D1 is provided to prevent this voltage from swinging negative.

At time T2, the resonant inductor LR1 has been reset and diode D2 disconnects the resonant inductor LR1 from the first synchronous rectifier SQ1. Since both recovery switch SQ3 and switch SQ4 are driven from the same signal, the delay between the turn-on of recovery switch SQ3 and the turn-off of switch SQ4 is controlled by the value of resistor R1 and the input capacitance of switch SQ4. The operation of recovery switch SQ5 and resonant inductor LR2 operate in the same manner, as described above, to recover the energy from discharging second synchronous rectifier SQ2.

Figure 3:
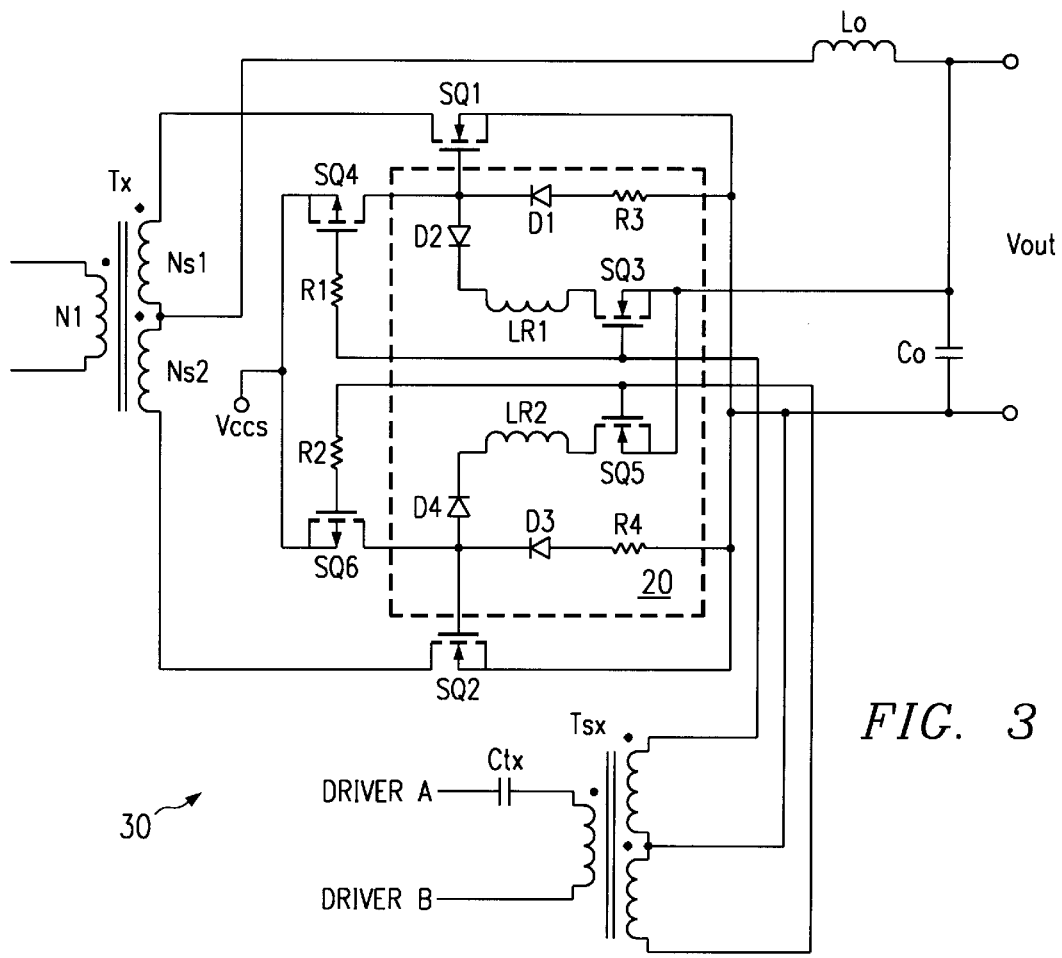
FIG. 3 shows an embodiment of the present externally-driven synchronous rectifier having diode reverse recovery limiting resistors.

In most practical implementations when the current through resonant inductors LR1 and LR2 decreases back to zero, diodes D2 and D4 do not turn-off instantaneously and current flows back through the diodes D2 and D4 (this is the reverse recovery effect) thus re-charging the input capacitance of synchronous rectifiers SQ1 and SQ2. If this capacitance is recharged above one volt, the synchronous rectifiers SQ1 and SQ2 will try to turn back on resulting in flawed operation. In order to minimize this effect, a saturable inductor can be used in place of resonant inductors LR1 and LR2, or resistors R3 and R4 can be placed in series with diodes D1 and D3, respectively, within the energy recovery circuit 20 as shown in FIG. 3.

Adding resistors R3 and R4 allows the voltage across the synchronous rectifiers SQ1 and SQ2 to swing below ground. Therefore, the input capacitance $C_{iss\_eq}$ of synchronous rectifiers SQ1 and SQ2 is recharged. Due to the effects of reverse recovery on diodes D2 and D3, the voltage across the synchronous rectifiers SQ1 and SQ2 will remain below ground. This will guarantee the correct operation of the energy recovery circuit 20 for synchronous rectifier circuit 30 of FIG. 30.

Figure 4:
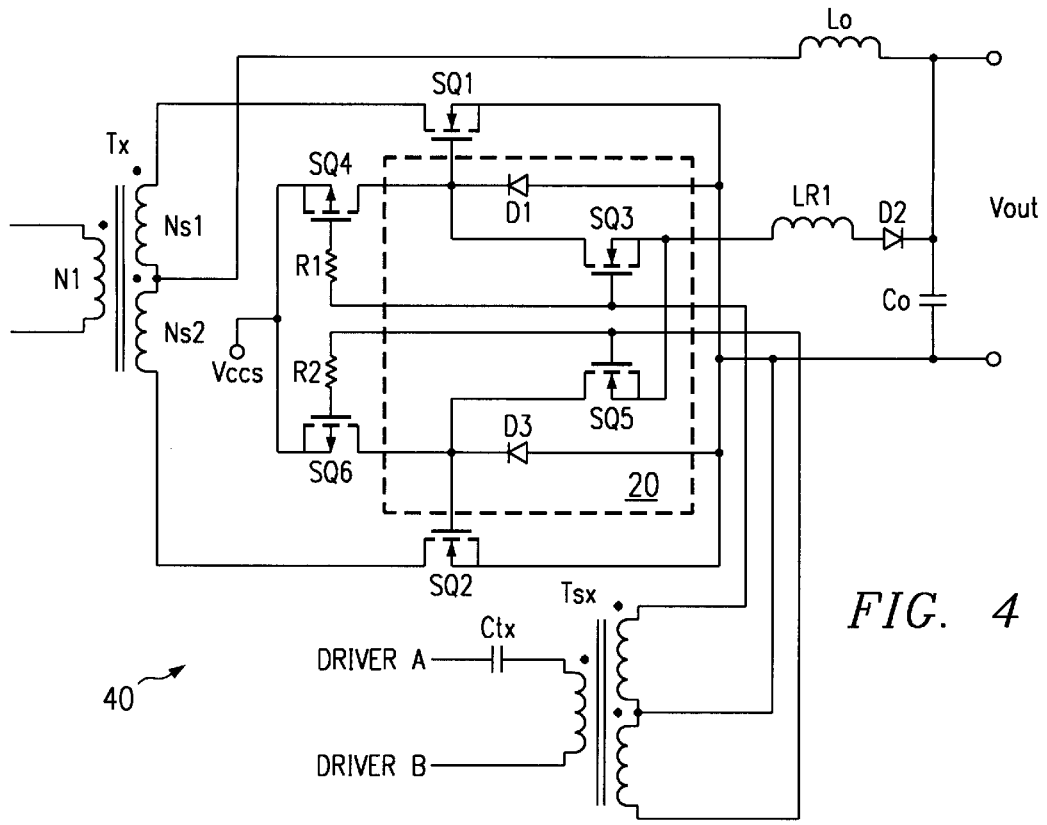
FIG. 4 shows an embodiment of the present externally-driven synchronous rectifier when the two resonant networks are merged.

Even if two resonant networks are merged, a very similar performance can be obtained if the two resonant networks are merged into one as shown in the synchronous rectifier circuit 40 of FIG. 4. Essentially, an additional delay is introduced with driving recovery switches SQ3 and SQ5 since they have to be turned on through resonant inductor LR1. Resistors R1 and R2 are provided and can be re-scaled to make up for this delay, thus ensuring the proper timing for synchronous rectifier circuit 40.

Figure 5:
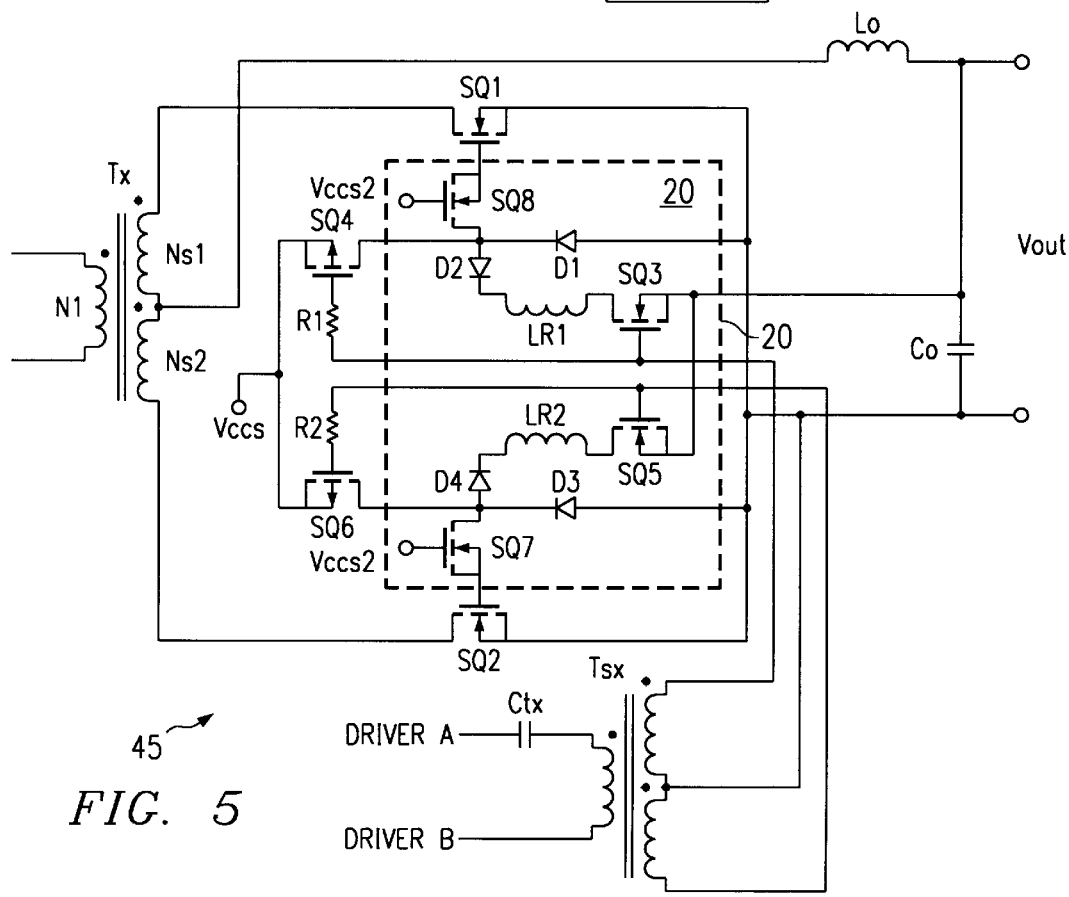
FIG. 5 is another embodiment of the present invention with voltage limiting MOSFETs.

In some applications it may be necessary to provide a voltage across the synchronous rectifiers SQ1 and SQ2 that is different from that provided by the secondary-supply voltage Vccs. The differing voltage can be provided by adding two additional N-type MOSFETs to the energy recovery circuit 20 as shown in the synchronous rectifier 45 of FIG. 5. In FIG. 5, Vccs2 has a lower value than Vccs to limit the charging voltage across the synchronous rectifiers SQ1 and SQ2.

In the previous embodiments, only the discharging of the synchronous rectifiers SQ1 and SQ2 has been accomplished in a loss-less manner (i.e. the energy from discharging is recovered by transferring it to the output terminal Vout). If it is desirable to also charge the gate capacitance of synchronous rectifiers SQ1 and SQ2 in a loss-less manner, an additional auxiliary winding 50 can be added to the output inductor Lo to provide the correct charging pulse for the synchronous rectifiers SQ1 and SQ2 as shown in FIG. 6A. Shown in FIG. 6B are typical waveforms describing the operation of synchronous rectifier circuit 60 of FIG. 6A.

The totem-pole drivers SQ4 and SQ6 are now driven from a pulsating source provided by the auxiliary winding 50 in the output inductor Lo. It is this pulsating source that allows the gate capacitance of the synchronous rectifiers SQ1 and SQ2 to be charged in a loss-less manner.

Figure 7A:
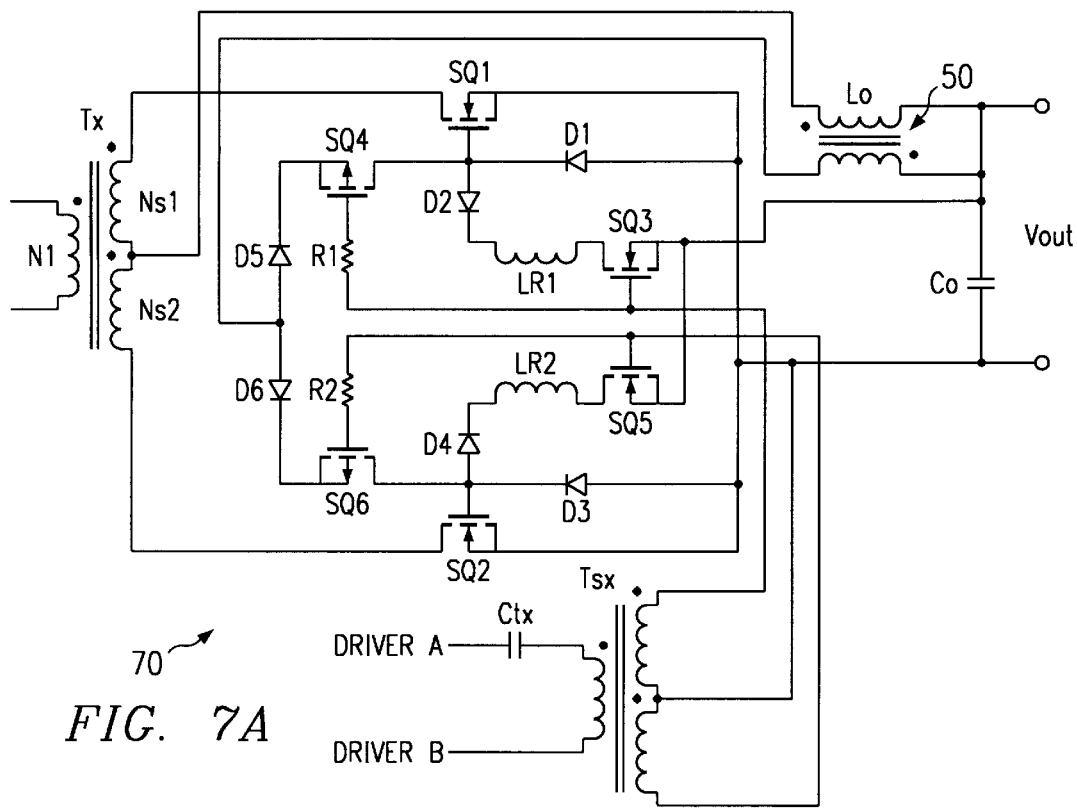
FIG. 7A illustrates an alternative embodiment of the present invention having an auxiliary output inductor winding.

For low voltage applications, the auxiliary winding 50 in the output inductor Lo has a high number of turns making it impractical. In order to reduce the number of turns in the auxiliary winding, the embodiments of the present invention shown in FIGS. 7A and 7B can be used. Specifically, in the synchronous rectifier circuit 70, the auxiliary winding 50 is coupled to the positive side of the voltage terminal Vout as opposed to coupling of the auxiliary winding 50 to the return end of the voltage terminal Vout as shown in FIG. 6A. This will allow a reduced number of turns for the auxiliary winding 50.

Figure 7B:
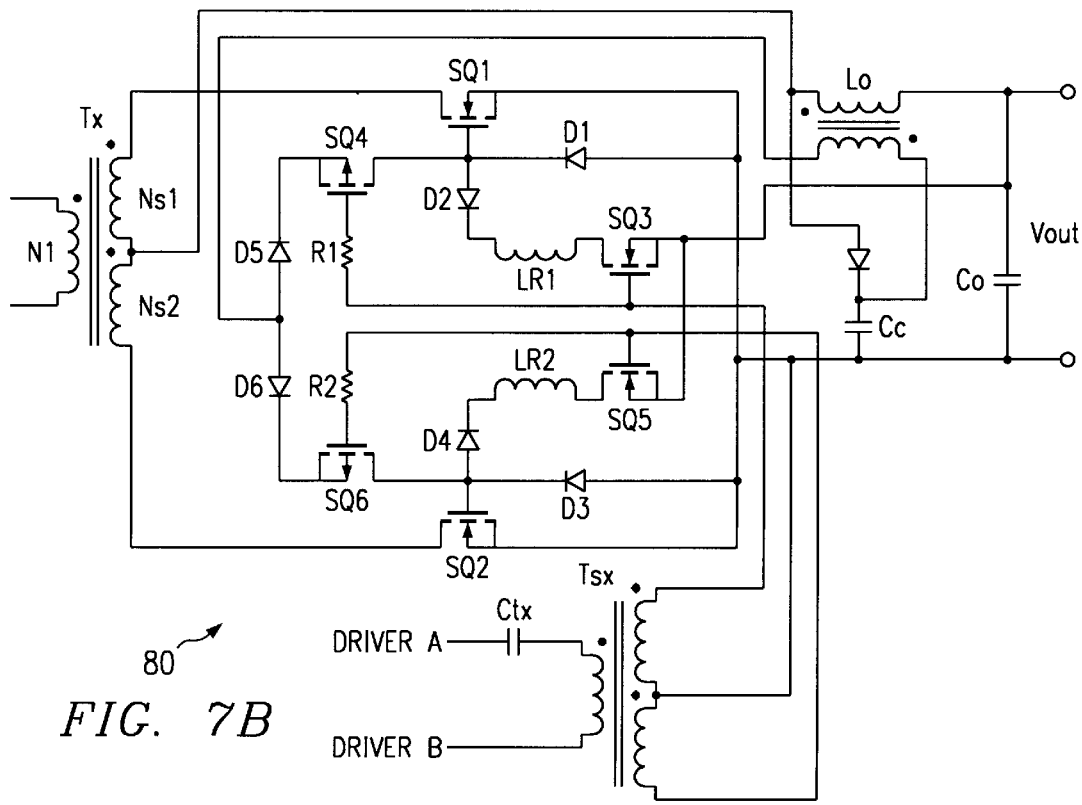
FIG. 7B illustrates another alternative embodiment of the present invention having an auxiliary output inductor winding.

In the synchronous rectifier circuit shown in FIG. 7B, the pulsating source voltage does not necessarily swing negative. Where the auxiliary winding turns ratios are less than 1/(1-Vo*N/Vin), where N is the primary transformer turns ratio, the pulsating source voltage is always positive. For this condition, true loss-less charging of the input capacitance $C_{iss\_eq}$ of the synchronous rectifiers SQ1 and SQ2 is not attained. However, even under this condition, the losses associated with charging the input capacitance $C_{iss\_eq}$ of synchronous rectifiers SQ1 and SQ2 are substantially reduced. Furthermore, by not referencing the auxiliary winding 50 to ground, driving capability will be not lost during short circuit conditions.

Figure 8:
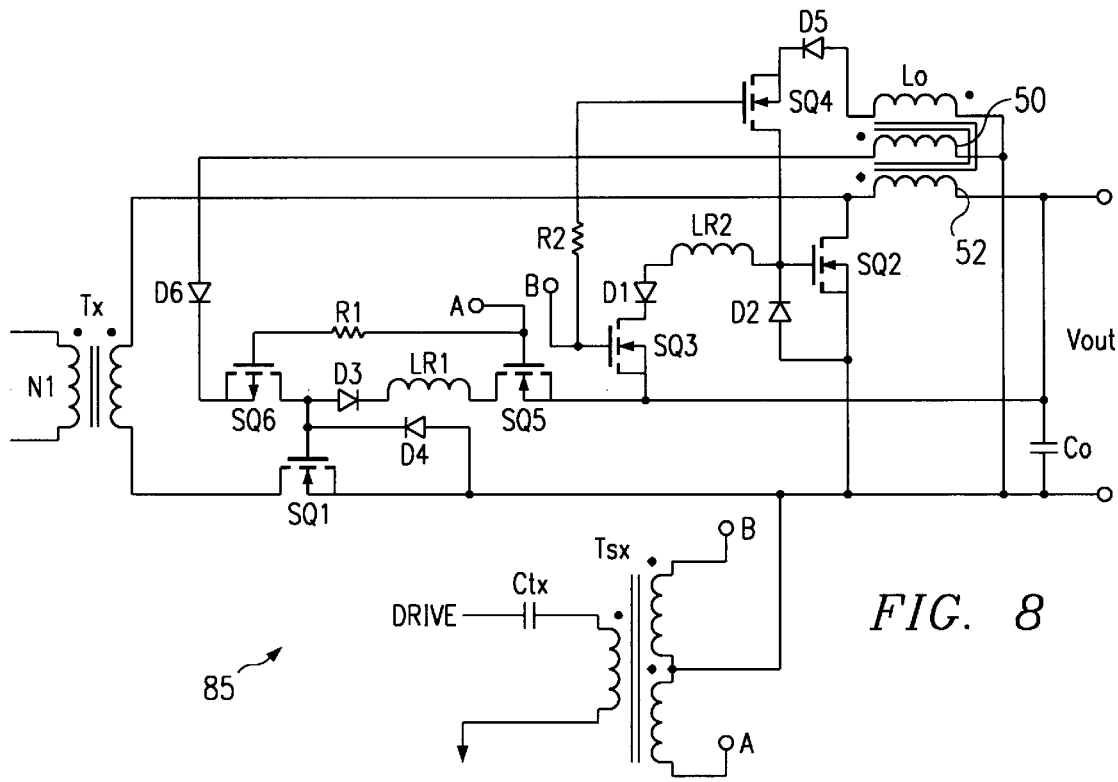
FIG. 8 is an implementation for a typical half-wave rectifier utilizing the present invention.

The embodiments of the resonant gate drive for a full wave rectifier have been shown. However, the present invention can be adapted to be implemented for the half-wave rectifier and non-isolated topologies. FIG. 8 shows an embodiment for the resonant gate drive synchronous rectifier 85 for the half-wave rectifier. A second auxiliary winding 52 has been added to facilitate the use of the present invention for a half-wave rectifier. Both resonant networks can be combined and the auxiliary windings 50 and 52 can be referenced from different places in the synchronous rectifier circuit 85 as explained above.

Figure 9A:
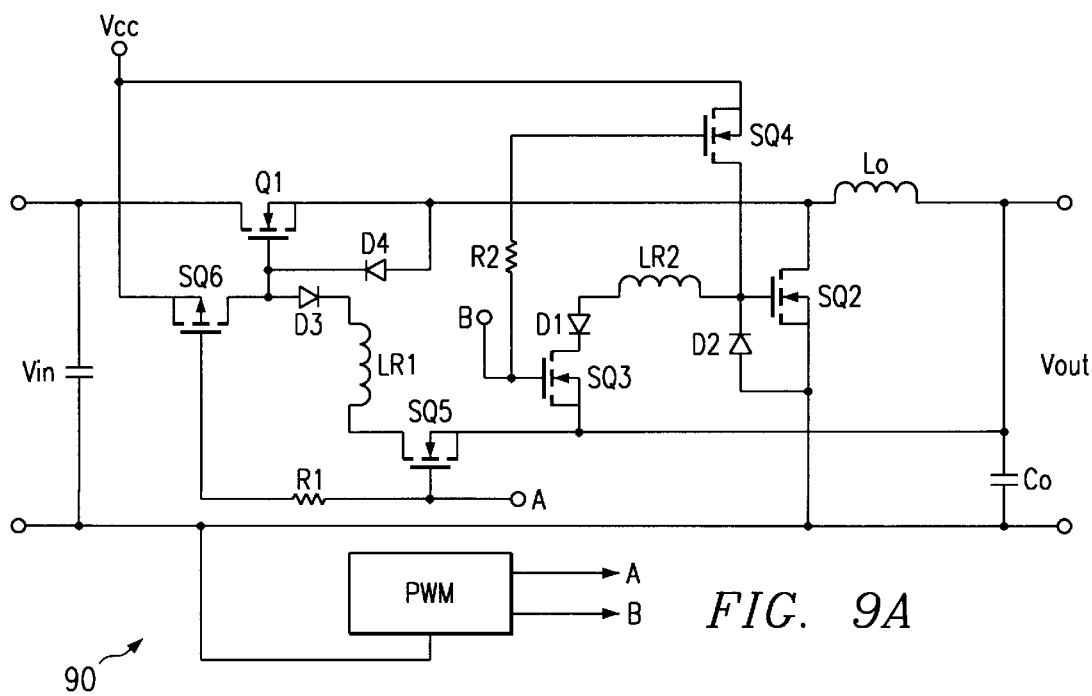
FIG. 9A is an implementation for a buck type converter utilizing the present invention.
Figure 9B:
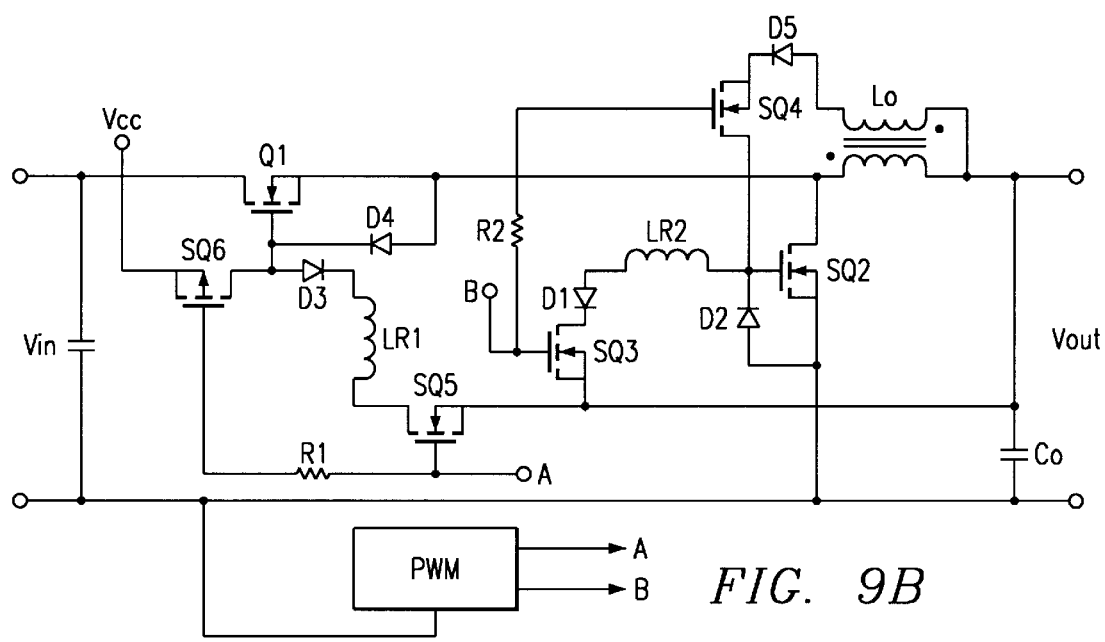
FIG. 9B is another implementation for a buck type converter utilizing the present invention.

The recovery of the discharged energy stored in the input capacitance $C_{iss\_eq}$ of the main switch and synchronous rectifiers SQ1 and SQ2 for a buck type converter 90 (step down converter) not having an isolation stage can also be achieved as shown in FIG. 9A. If desired, the input capacitance $C_{iss\_eq}$ of the synchronous rectifiers SQ1 and SQ2 can also be charged in a loss-less manner as shown by the synchronous rectifier circuit 100 of FIG. 9B.

The novel method and system of the present resonant gate drive provides the advantage of efficiently recovering the energy from charging and discharging the synchronous rectifiers SQ1 and SQ2. Another advantage of the present invention is the ability recover large amounts of the circulating energy of the circuit. Yet another advantage of the present invention is the adaptability of the present invention to be efficiently used with a broad range of switching frequencies. A further advantage of the present invention is the ability to adapt the present invention to various types of converter topologies.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. The synchronous rectifiers SQ1 and SQ2 and switches SQ3, SQ4, SQ5, and SQ6 are shown as MOSFETs; however, it is contemplated that another type of FET or switching device would be suitable for use in the present invention. It is therefore intended that the appended claims encompass any such modifications or embodiments.

What is claimed is:

1. An externally driven synchronous rectifier circuit for a DC-to-DC power converter comprising:
   a primary transformer having a primary and secondary winding, said secondary winding having a first terminal and a second terminal;

a first synchronous rectifier operably coupled to said first terminal of said secondary winding;

a second synchronous rectifier operably coupled to said second terminal of said secondary winding;

an external drive circuit operably coupled to said first and second synchronous rectifiers to provide timing signals to turn on and off said first and second synchronous rectifiers;

an energy recovery circuit coupled to said first and second synchronous rectifiers and configured for storing energy associated with charging and discharging the input capacitance said first and second synchronous rectifiers; and an output voltage terminal coupled to said energy recovery circuit for receiving rectified voltage waveforms.

2. The externally driven synchronous rectifier circuit of claim 1 wherein said external drive circuit includes a second transformer with a primary winding and a secondary winding, said secondary winding having first and second terminals through which said timing signals are delivered to said first and second synchronous rectifiers.

3. The externally driven synchronous rectifier circuit of claim 2 further comprising:

a first switch having a gate, said first switch coupled to a voltage source;

a second switch having a gate, said second switch coupled to a voltage source;

a first resistor coupled in series between said gate of said first switch and said first terminal of said secondary winding of said second transformer; and a second resistor coupled in series between said gate of said second switch and said second terminal of said secondary winding of said second transformer.

4. The externally driven synchronous rectifier circuit of claim 1 wherein said first and second synchronous rectifiers are Field Effect Transistors devices with first, second and third terminals.

5. The externally driven synchronous rectifier circuit of claim 2 wherein said energy recovery circuit further comprises:

a first resonant inductor with first and second terminals;

a first set of diodes connected to a first terminal of said first synchronous rectifier circuit and arranged to direct current through said first resonant inductor via said first set of diodes;

a second resonant inductor with first and second terminals; and a second set of diodes connected to a first terminal of said second synchronous rectifier circuit and arranged to direct current through said first resonant inductor via said second set of diodes.

6. The externally driven synchronous rectifier circuit of claim 5 further comprising:

a first recovery switch operably coupled to first resonant inductor and to said first terminal of said secondary winding of said second transformer for obtaining timing signal therefrom;

a second recovery switch operably coupled to second resonant inductor and to said second terminal of said secondary winding of said second transformer for obtaining timing signal therefrom.

7. The externally driven synchronous rectifier circuit of claim 1 further comprising:

a center tap connected to said secondary winding of said second transformer; and an output inductor with a first terminal coupled to said center tap and a second terminal coupled to said output terminal.

8. The externally driven synchronous rectifier circuit of claim 7 wherein said output inductor further comprises an auxiliary winding configured to provide a correct charging pulse for said first and second synchronous rectifiers.

9. The externally driven synchronous rectifier circuit of claim 8 wherein said auxiliary winding is coupled to the positive end of said output terminal and whereby the number of turns of said auxiliary winding are reduced for low voltage synchronous rectifier circuits.

10. The externally driven synchronous rectifier circuit of claim 9 further comprising:

an auxiliary winding diode coupled to said first and second recovery switches; and an auxiliary capacitor coupled in series with said auxiliary winding diode.

11. The externally driven synchronous rectifier circuit of claim 8 further comprising a second auxiliary winding whereby said energy recovery circuit is adaptable as a half-wave rectifier.

12. An energy recovery mechanism for an externally driven synchronous rectifier circuit having a primary transformer, first and second synchronous rectifiers, an output terminal, and an external driving circuit configured to provide the timing signals for driving said first and second synchronous rectifiers, said mechanism comprising:

first and second resonant inductors each having first and second terminals;

first and second recovery switches coupled to corresponding first terminals of said first and second resonant inductors;

a first set of diodes arranged to direct current into said second terminal of said first resonant inductor;

a second set of diodes arranged to direct current into said second terminal of said second resonant inductor; and wherein said first and second recovery switches are further coupled to said external driving circuit for causing current to enter said first and second resonant inductors to recover energy used in charging and discharging said first and second synchronous rectifiers.

13. The energy recovery circuit of claim 12 further comprising:

a storage inductor coupled to said first and second recovery switches; and an output diode coupled in series with said storage inductor, said output diode further configured to prevent energy from returning back to said first and second recovery switches.

14. The energy recovery circuit of claim 12 further comprising first and second resistors coupled to said first and second recovery switches and configured to effect the timing operation of said first and second recovery switches.

15. The energy recovery circuit of claim 12 further comprising:

a third recovery switch operably disposed between said first synchronous rectifier and one of said first set of diodes; and a fourth recovery switch operably disposed between said second synchronous rectifier and the other of said first set of diodes;

whereby the voltage across said first and synchronous rectifiers can be limited to a voltage other than that of the supply voltage by the operation of said third and fourth recovery switches.

16. The energy recovery circuit of claim 12 wherein said first and second recovery switches are MOSFETs.

17. A method of energy recovery for an energy recovery circuit utilized with a self-driven synchronous rectifier circuit having a first and second synchronous rectifier and an output terminal, said energy recovery circuit having a first and second switch and an at least one storage inductor, said method comprising the steps of:

capturing the energy of said synchronous rectifiers in said storage inductor; and transferring the stored energy from said storage inductor to said output terminal.

18. The method of claim 17 wherein said step of capturing the energy of the capacitance of said synchronous rectifiers includes capturing the charging energy of said synchronous rectifiers.

19. The method of claim 17 wherein said step of capturing the energy of the capacitance of said synchronous rectifiers includes capturing the discharging energy of said synchronous rectifiers.

* * * * *